United States Patent
Martin

(10) Patent No.: US 6,498,346 B1
(45) Date of Patent: Dec. 24, 2002

(54) LARGE DYNAMIC RANGE FOCAL PLANE ARRAY

(75) Inventor: Robert J. Martin, Orlando, FL (US)

(73) Assignee: Lockheed Martin Corporation, Bethesda, MD (US)

(*) Notice: Subject to any disclaimer, the term of this patent is extended or adjusted under 35 U.S.C. 154(b) by 93 days.

(21) Appl. No.: 09/666,296

(22) Filed: Sep. 21, 2000

(51) Int. Cl.$^7$ ................................................ H01L 27/14
(52) U.S. Cl. ............... 250/332; 250/370.01; 250/338.4; 250/340; 250/214 R
(58) Field of Search ............................... 250/332, 338.4, 250/370.01, 340, 214 R, 250 AL; 327/336, 337

(56) References Cited

U.S. PATENT DOCUMENTS

| | | |
|---|---|---|
| 4,903,101 A | 2/1990 | Maserjian |
| 4,956,686 A | 9/1990 | Borrello et al. |
| 5,013,918 A | 5/1991 | Choi |
| 5,047,822 A | 9/1991 | Little, Jr. et al. |
| 5,198,659 A | 3/1993 | Smith et al. |
| 5,300,780 A | 4/1994 | Denney et al. |
| 5,355,000 A | 10/1994 | Delacourt et al. |
| 5,384,469 A | 1/1995 | Choi |
| 5,488,504 A | 1/1996 | Worchesky et al. |
| 5,539,206 A | 7/1996 | Schimert |
| 5,629,522 A | 5/1997 | Martin et al. |
| 5,965,899 A | 10/1999 | Little, Jr. |

OTHER PUBLICATIONS

Lester J. Kozlowski, et al., "LWIR 128×128 GaAs/AlGaAs Multiple Quantum Well Hybrid Focal Plane Array", IEEE Translation on Electron Devices, vol. 38, No. 5, May 1991, pp. 1124–1130.

A Köck, et al., "Double Wavelength Selective GaAs/AlGaAs Infrared Detector Device", Applied Physics Letters 60(16), Apr. 20, 1992, pp. 2011–2013.

I.Gravá, et al., "Voltage–Controlled Tunable GaAs/AlGaAs Multistack Quantum Well Infrared Detector", Applied Physics Letters 60 (19), May 11, 1992, pp. 2362–2364.

E. Martinet, et al., Switchable Bicolor (5.5–9.0 $\mu$m) Infrared Detector Using Asymmetric GaAs/AlGaAs Multiquantum Well, Applied Physics Letters 61(3), Jul. 20, 1992, pp. 246–248.

K. Kheng, et al., "Two–Color GaAs/(AlGa)As Quantum Well Infrared Detector With Voltage–Tunable Spectral Sensitivity At 3–5 and 8–12 $\mu$m", Applied Physics Letters 61(6), Aug. 10, 1992, pp. 666–668.

K.L. Tsai, et al., "Two–Color Infrared Photodetector Using GaAs/AlGaAs and Strained InGaAs/AlGaAs Multiquantum Wells", Applied Physics Letters 62 (26, Jun. 28, 1993, pp. 3504–3506.

(List continued on next page.)

*Primary Examiner*—Constantine Hannaher
*Assistant Examiner*—Tim Moran
(74) *Attorney, Agent, or Firm*—Burns, Doane, Swecker & Mathis, LLP

(57) ABSTRACT

An infrared photodetector focal plane array includes large dynamic range Read Out Integrated Circuits. Increased dynamic ranges are achieved in each ROIC of the array using switched capacitor filter arrangements that include a single "cup" capacitor and at least two "bucket" capacitors. Dynamic range is improved by controlling the ratio of the current to voltage transfer resistance gains between the "cup" capacitor and each "bucket" capacitor of the filter. With an increased dynamic range, the switched capacitor filter arrangement allows the focal plane array to adequately resolve the infrared radiation received from both hot and cold objects.

11 Claims, 4 Drawing Sheets

OTHER PUBLICATIONS

B.F. Levine, "Quantum–Well Infrared Photodetectors", Jornal of Applied Physics 74(8), Oct. 15, 1993, pp. 1–87.

C.G. Bethea, et al., "Long Wavelength Infrared 128×128 $Al_xGa_{1-x}As$/GaAs Quantum Well Infrared Camera and Imaging System", IEEE Transactions on Electron Devices, vol. 40, No. 11, Nov. 1993, pp. 1957–1963.

G. Sarusi, et al., "Improved Performance of Quantum Well Infrared Photodetectors Using Random Scattering Optical Coupling", Applied Physics Letters 64 (8), Feb. 21, 1994, pp. 960–962.

Y.H. Wang, et al., "A GaAs/AlAs/GaAs and GaAs/AlGaAs Stacked Quantum Well Infrared Photodetector For 3–5 and 8–14 $\mu$m Detection", Journal of Applied Physics 76(4), Aug. 15, 1994, pp. 2538–2540.

M.Z. Tidrow, et al., "Grating Coupled Multicolor Quantum Well Infrared Photodetectors", Applied Physics Letters 67(13), Sep. 25, 1995, pp. 1800–1802.

C.J. Chen, et al., Corrugated Quantum Well Infrared Photodetectors For Normal Incident Light Coupling, Applied Physics Letter 68(11), Mar. 11, 1996, pp. 1446–1448.

T.R. Schimert, et al., "Enhanced Quantum Well Infrared Photodetor With Novel Multiple Quantum Well Grating Structure", Applied Physics Letters 68 (20), May 13, 1996, pp. 2846–2848.

W.A. Beck, et al., "Imaging Performance of 256×256 LWIR Miniband Transport Multiple Quantum Well Focal Plane Arrays", pp. 1–14, Proc. Second Int. Symp. 2–20 $\mu$m Wavelength Infrared Dets. and Arrays: Phys. and Appl., Oct. 10–12, 1994, Miami Beach, Florida.

LARGE DYNAMIC RANGE FOCAL PLANE ARRAY

The present application is related to Application Ser. No. 09/666,847, entitled "Three Color Quantum Well Focal Plane Arrays", Application Ser. No. 09/666,828, entitled "Programmable Hyper-Spectral Infrared Focal Plane Array," Application Ser. No. 09/666,301, entitled "Two Color Quantum Well Focal Plane Arrays," Application Ser. No. 09/665,959, entitled "Clutter Discriminating Focal Plane Array," and Application Ser. No. 09/666,297, entitled "Remote Temperature Sensing Long Wavelength Modulated Focal Plane Array," all filed on even date herewith. The disclosures of the above identified Patent Applications are herein incorporated by reference.

BACKGROUND OF THE INVENTION

1. Field of the Invention

The present invention is directed generally to Quantum Well Infrared photodetector Focal Plane Arrays (QWIP FPA's) and, more particularly, to increasing the dynamic range of QWIP FPA's.

2. State of the Art

Quantum Well Infrared Photodetector Focal Plane Arrays (QWIP FPA's) are conventionally used for infrared detection and imaging. Typical applications of QWIP FPA's include fiber optics communications systems, temperature sensing, night vision, eye-safe range finding, and process control. As is known in the art, QWIP FPA's are composed of arrays of detector structures, wherein each detector structure produces a signal that is transmitted through a conductor bump to an external Read Out Integrated Circuit (ROIC) unit cell. The outputs of the plurality of ROIC unit cells associated with each detector in the array produce an integrated representation of the signal from the detector. To produce this output signal, a fixed bias is applied to the detector and the detector photocurrent resulting from the bias and the incident radiation is integrated. This integration function is performed by an integration charge well (integration capacitor) that is disposed within each individual ROIC unit cell. The combined integrated outputs of the plurality of ROIC unit cells in the array produce an image corresponding to the received infrared radiation.

As shown in FIG. 1, a conventional ROIC 100 maintains a constant bias across the QWIP photodetector 105 through the use of a direct injection transistor 110. Application of an operating bias $V_{bias}$ 115 at the gate of the direct injection transistor 110 sets the maximum saturation current of the transistor and, in conjunction with the Detector Common bias voltage $V_{DETCOM}$ 120, determines the voltage across the QWIP. The photocurrent from the QWIP is integrated by the integrating capacitor (charge well) 125 which is connected to the output of the direct injection transistor 110. The integrating capacitor 125, in conjunction with the reset switch 130, performs a "dump-ramp-sample" (DRS) process to integrate the photocurrent i from the QWIP. One cycle of a DRS process typically involves first closing the Switch 130 to "dump" any charge stored in the integrating capacitor 125 and then opening the switch 130 to allow the flow of charge from the QWIP to accumulate in the charge well 125 over an integration period τ. The voltage on the charge well 125 "ramps" during the charge accumulation period. When the multiplexer 135 is "closed," the voltage on the charge well 125 is "sampled" by the subsequent read-out circuitry (e.g., amplifier, A/D converter).

QWIP photo-current, using a narrow-band flux approximation, is represented by the following:

$$i(T) = \tau_o \Omega A_d \eta g q \Phi_p e^{\left(\frac{-T_p}{T}\right)} \text{ amperes} \qquad \text{Eqn. (1)}$$

where:

$\tau_o$ is the optical transmission efficiency, $\Omega$ is the optical solid viewing angle, $A_d$ is the pitch area of the detector in $cm^2$, $\eta$ is the detector quantum efficiency, g is the photoconductive gain, q is the electron charge ($1.6*10^{-19}$ coulombs), $\Phi_p$ is the peak flux in photons/second/$cm^2$/steradian, $T_p$ is the peak temperature in Kelvin, and i(T) is the photocurrent in amperes.

As can be seen from Eqn. (1) above, the greater the peak flux ($\Phi_p$) and the temperature (T) of the infrared source, the greater the flow of charge per unit time (i(T)=dq(T)/dt). Therefore, for any given level of peak flux ($\Phi_p$), the temperature (T) of the infrared source will determine the rate of charge per unit time. The charge will thus accumulate in the charge well 125 faster at high temperatures than at low temperatures. The length of the integration period τ will further determine how much charge will accumulate in the charge well 125 for any level of photo-current from the QWIP. Infrared sources at low temperatures will cause a low rate of charge accumulation in the charge well 125. Therefore, only a small amount of charge will accumulate in the charge well over a short integration period. This can be problematic since the voltage on the charge well associated with the small amount of accumulated charge may not be sufficient to register in the noise floor of the A/D converter. The length of the integration period therefore effectively determines the lower dynamic range of the ROIC.

To overcome this problem, the integration period τ can be increased to permit a larger charge accumulation in the charge well as a result of the low temperature of the infrared source. The larger charge accumulation in the charge well will therefore advantageously raise the voltage across the charge well to a high enough level to register above the noise floor of the A/D converter. Correspondingly, however, increasing the integration period will permit high rates of charge, induced by high temperature sources, to accumulate quickly in the charge well. Accumulation of large amounts of charge in the charge well will likely cause a maximum saturation voltage to be reached across the charge well. Long integration times will therefore limit the ability of the ROIC to resolve high temperature sources without saturation, and thus will effectively limit the upper dynamic range of the FPA.

The conventional read circuitry shown in FIG. 1 therefore is deficient when the QWIP Focal Plane Array is used for imaging infrared objects that have greatly differing temperatures. The limitations on the dynamic range induced by a given integration period limits the ability of each detector to detect cold or hot objects with equal resolution. Thus, if the integration period is set to a length to adequately detect a cold object with sufficient resolution then the detector current output will likely saturate before detecting a hot object. In contrast, if the integration period is set to detect a hot object with sufficient resolution then the low current levels output from the detector will likely fall below the noise floor and thus not be sufficiently resolved by the analog-to digital converter. The conventional read out circuitry shown in FIG. 1 is therefore unable to maintain a sufficient dynamic range to adequately resolve the infrared radiation from both hot and cold objects.

Thus, it would be advantageous to construct a read out circuit that can resolve infrared radiation, from both hot and cold infrared sources, that is incident upon a quantum well photodetector.

SUMMARY OF THE INVENTION

An infrared photodetector focal plane array of exemplary embodiments of the invention includes large dynamic range Read Out Integrated Circuits. Increased dynamic ranges are achieved in each ROIC of the array using switched capacitor filter arrangements that include a single "cup" capacitor and at least two "bucket" capacitors. Dynamic range is improved by controlling the ratio of the current to voltage transfer resistance gains between the "cup" capacitor and each "bucket" capacitor of the filter. With an increased dynamic range, the switched capacitor filter arrangement allows the focal plane array to adequately resolve the infrared radiation received from both hot and cold objects.

One exemplary embodiment of the invention is directed to a method of sampling moving charges from a quantum well photodetector comprising the steps of: accumulating a first quantity of charges from said photodetector in a first charge storage device; supplying said first quantity of charges to a second storage device; accumulating a second quantity of charges from said photodetector in said first charge storage device; and supplying said second quantity of charges to a third charge storage device.

An additional exemplary embodiment of the invention is directed to a switched filter comprising: a first charge storage device for storing moving charges received from a quantum well photodetector; and switching means for selectively supplying a first quantity of charges from said first charge storage device to a second charge storage device and a second quantity of charges from said first charge storage device to a third charge storage device.

A further exemplary embodiment of the invention is directed to a focal plane array comprising: a plurality of quantum well photodetectors; a plurality of switched filters, each switched filter associated with a photodetector of said plurality of photodetectors, wherein each switched filter comprises: a first charge storage device for storing moving charges received from an associated photodetector; and switching means for selectively supplying a first quantity of charges from said first charge storage device to a second charge storage device and a second quantity of charges from said first charge storage device to a third charge storage device.

BRIEF DESCRIPTION OF THE DRAWINGS

Other objects and advantages of the invention will be apparent to those skilled in the art reading the following detailed description of the preferred embodiments in conjunction with the drawings in which like reference numbers have been used to indicate like elements, and wherein.

DETAILED DESCRIPTION OF THE PREFERRED EMBODIMENTS

Figure 1:
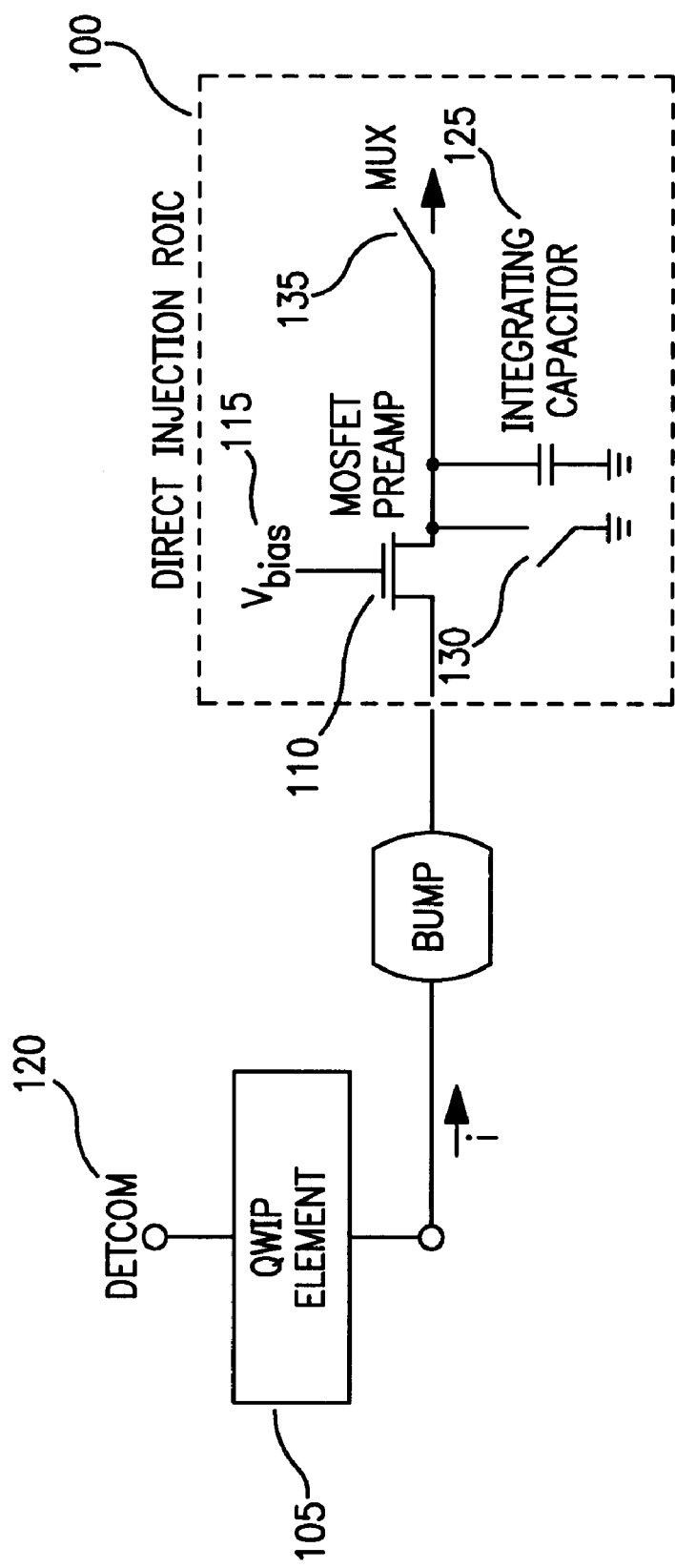
FIG. 1 illustrates a conventional QWIP and Read Out Integrated Circuit.

An increased dynamic range ROIC, as compared to the conventional ROIC of FIG. 1, can be achieved in exemplary embodiments of the present invention by sampling and processing the charge accumulated in a "cup" capacitor at multiple times during a charge well integration period τ. Each amount of charge that is sampled during this integration period is stored in separate charge storage devices that supply charge to their own time division multiplexers and analog-to-digital converters. The time intervals $t_i$ during an integration period τ at which charge is supplied to each charge storage device determines the dynamic range of the ROIC.

Figure 2:
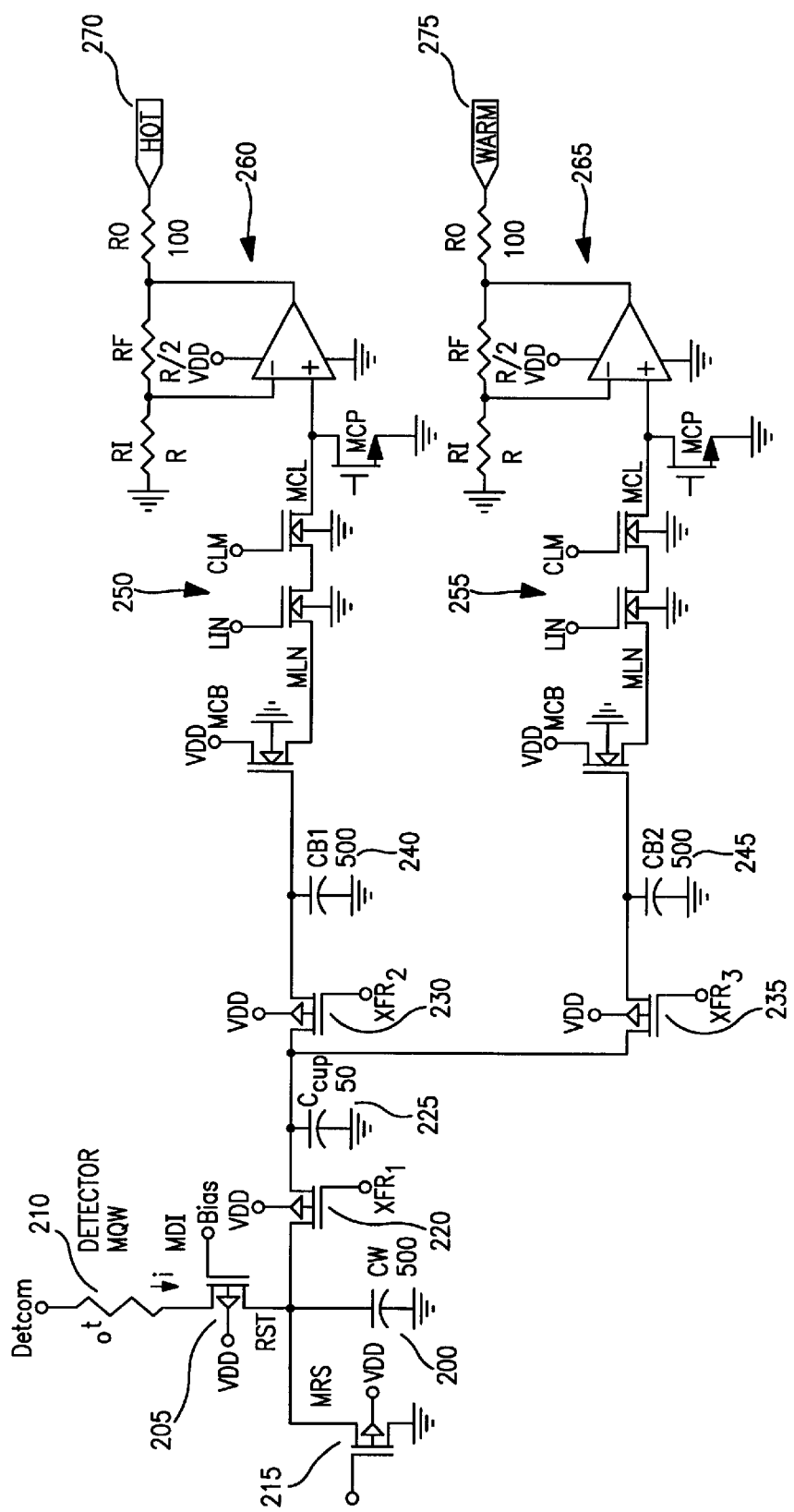
FIG. 2 is a schematic of ROIC circuitry in accordance with an exemplary embodiment of the invention.

In one exemplary embodiment, shown in FIG. 2, the multiple sampling of the charge well 200 occurs only twice during the integration of the charge well. The direct injection transistor 205 is biased so as to provide a specified voltage across the detector 210 and to provide a maximum transistor saturation current. The output of the drain of the transistor 205 is connected to charge well 200 which accumulates the charge from the detector 210. The charge well 200 operates, in conjunction with the transistor switch MRS 215, on a dump, ramp, and sample sequence. In this exemplary embodiment, two samples of the charge "cup" 225 are taken at integration times $t_1$ and $t_2$ during the charge well integration period τ. One sample is taken towards the beginning of the integration period τ, and the other is taken at the end of the integration period τ. The read out circuitry shown in FIG. 2 uses two separate circuit paths for processing the photo-current derived from the QWIP. The processing of the photo-current from the quantum well layer uses a "cup" and "bucket" technique with capacitor $C_{cup}$ 225 representing the charge "cup" and capacitors $C_{B1}$ 240 and $C_{B2}$ 245 representing the charge "buckets."

Figure 3:
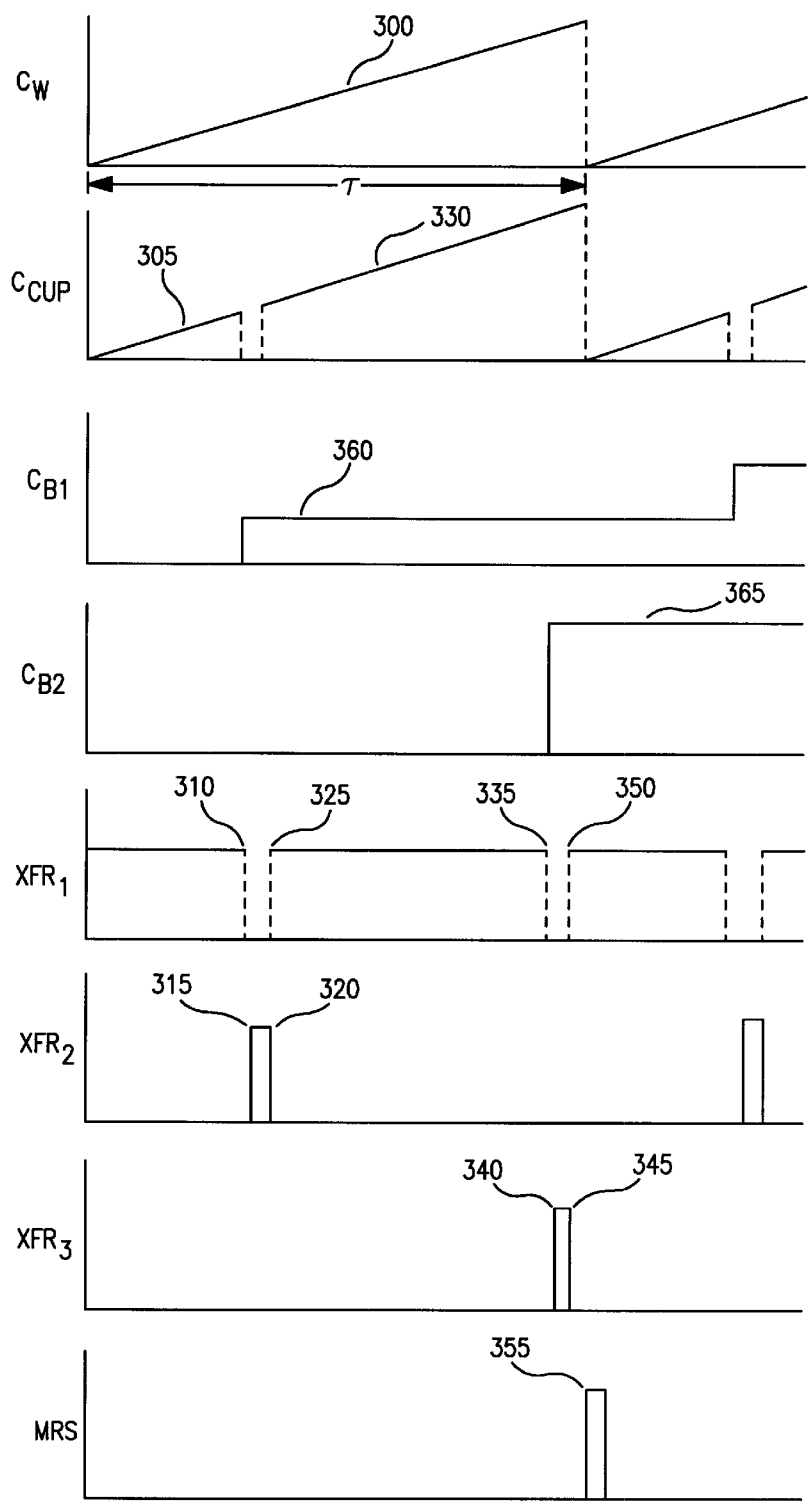
FIG. 3 is a timing diagram of the ROIC operation in accordance with an exemplary embodiment of the invention.

One cycle of the exemplary read out circuitry of FIG. 2 operates in the following described manner. Reset switch 215 is first opened and the photo-current from the detector causes charge to be accumulated (300; FIG. 3) in the charge well $C_w$ 200 and the "cup" capacitor $C_{cup}$ 225 (305; FIG. 3), $C_{cup}$ being connected in parallel with $C_w$ 200 via closed switch XFR$_1$ 220. At time $t_1$ during integration interval τ, switch XFR$_1$ 220 is opened (310; FIG. 3) to isolate $C_{cup}$ from $C_w$, and then XFR$_2$ is closed (315; FIG. 3) to connect $C_{cup}$ in parallel with the first charge "bucket" $C_{B1}$ 240. Due to the relative size of $C_{cup}$ to $C_{B1}$, the charge in the "cup" is emptied into the "bucket" (360; FIG. 3). Switch XFR$_2$ 230 is then opened (320; FIG. 3) and switch XFR$_1$ 220 is closed (325; FIG. 3) to reconnect the charge cup $C_{cup}$ 225 in parallel with the charge well 200. The uninterrupted integration period τ (e.g., the charge accumulation in $C_w$) continues, with the "cup" $C_{cup}$ 225 also again accumulating charge (330; FIG. 3).

At a time $t_2$ during the integration period τ, the switch XFR$_1$ 220 is again opened (335; FIG. 3) to isolate $C_{cup}$ from $C_w$ and XFR$_3$ 235 is then closed (340; FIG. 3) to connect $C_{cup}$ in parallel with the second charge bucket $C_{B2}$ 245. The charge in the "cup" is then emptied into the "bucket" $C_{B2}$ (365; FIG. 3). Switch XFR$_3$ 235 is then opened (345; FIG. 3) and switch XFR$_1$ 220 is closed (350; FIG. 3) to reconnect the charge cup $C_{cup}$ 225 in parallel with the charge well $C_w$ 200. To complete the cycle, reset switch MRS 215 is closed (355; FIG. 3) to "dump" accumulated charge in $C_w$ and $C_{cup}$. Voltages derived from the charges stored in $C_{B1}$ and $C_{B2}$ are supplied, via the time division multiplexers 250 and 255, to amplifiers 260 and 265. The above described cycle operates continuously and at multiple times during each output frame of the FPA.

The ratios of the integration time periods $t_i = \{t_1, t_2, \ldots\}$ to the charge well capacitance $C_W$ determines the current to voltage transfer resistance gains of each circuit path and therefore the effective dynamic range of the ROIC. Since the transfer resistance gain is represented by:

$$R_{trans} = \frac{t_i}{C_W} \qquad \text{Eqn. (2)}$$

the shorter integration time $t_1$ will have a smaller $R_{trans}$ as compared to the longer integration time $t_2$. Since the saturation voltage is fixed by the operating bias of the injection transistor 205, the smaller transfer resistance will not saturate over integration period $t_1$ unless the input flux is N times larger then the saturation level of the larger transfer resistance, where $N = t_2/t_1$. Control of the ratio can be achieved by adjusting the shorter integration time period $t_1$.

Therefore, sampling the charge from the "cup" capacitor early in the integration cycle (at $t_1$), and at the end of the integration cycle (at $t_2$), permits an increase in the range of infrared flux that can be resolved by the ROIC. With charges from the QWIP photocurrent sampled over a short integration time $t_1$, high levels of flux, that would normally cause saturation over a longer integration period, can be resolved at the "hot" output 270 of the ROIC. Also, with charges from the QWIP photocurrent sampled over a longer integration time $t_2$, low levels of flux, that would normally not register above the noise floor for shorter integration periods, can be resolved at the "warm" output 275 of the ROIC. Infrared sources of greatly differing temperatures can thus be detected with equal resolution at the ROIC outputs. The dynamic range of exemplary embodiments of the invention can therefore be increased by controlling the ratio of the current to voltage transfer resistance gains between the "cup" capacitor and each "bucket" capacitor.

Figure 4:
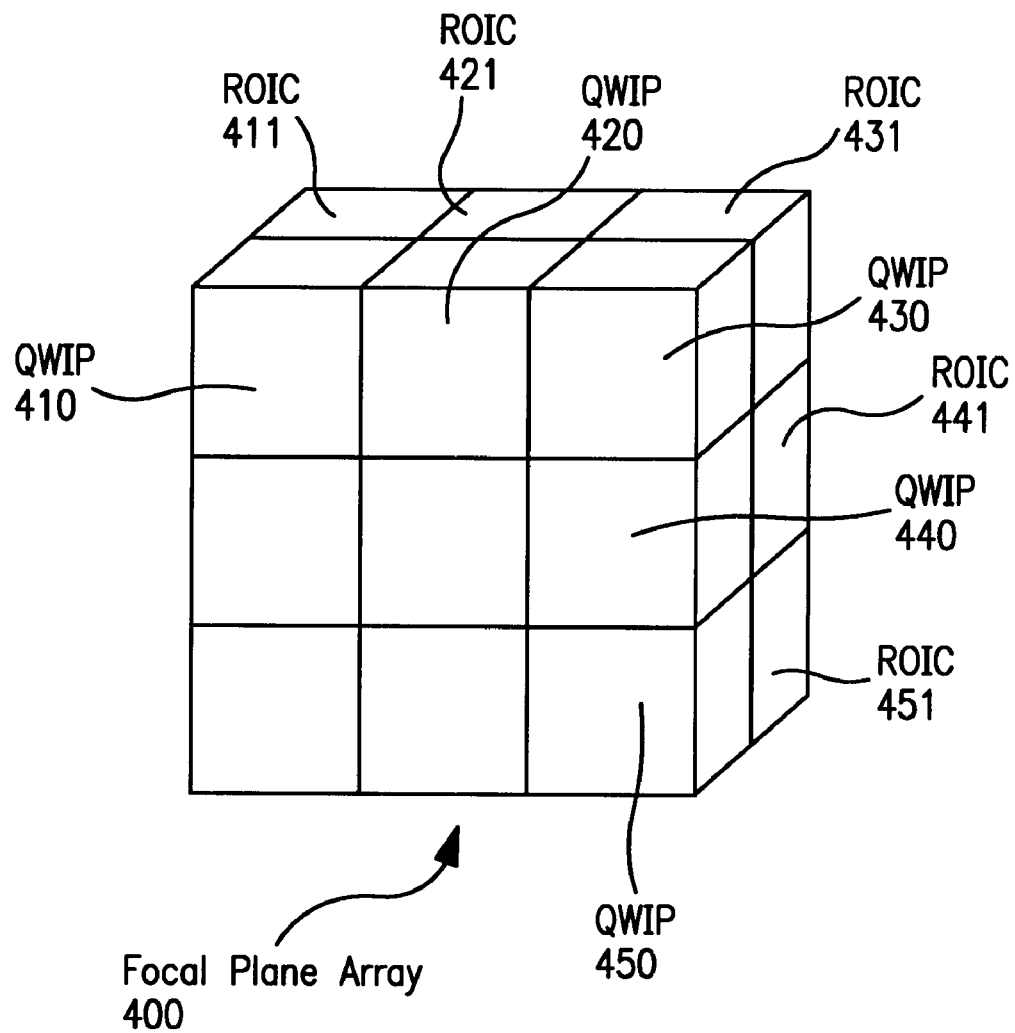
FIG. 4 is a geometric block diagram of a focal plane array in accordance with exemplary embodiments of the invention.

FIG. 4 shows a geometric block diagram of a focal plane array in accordance with exemplary embodiments of the invention, wherein a focal plane array 400 includes QWIPs 410, 420, 430, 440, 450 and corresponding ROICs 411, 421, 431, 441, 451 underlying the QWIPs. The ROICs shown in FIG. 4 can each be implemented using the configuration and circuits shown in FIG. 2.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method of sampling moving charges from a quantum well photodetector comprising the steps of:
   accumulating a first quantity of charges from the photodetector in a first charge storage device;
   supplying the first quantity of charges from the first charge storage device directly to a second storage device;
   accumulating a second quantity of charges from the photodetector in the first charge storage device; and
   supplying the second quantity of charges from the first charge storage device directly to a third charge storage device.

2. The method of claim 1, wherein the first quantity of charges is accumulated over a first integration period.

3. The method of claim 1, wherein the second quantity of charges is accumulated over a second integration period.

4. The method of claim 1, further comprising the step of:
   deriving voltages from the first and second quantities of charges.

5. A filter comprising:
   a first charge storage device for storing moving charges received from a quantum well photodetector; and
   switching means for selectively supplying a first quantity of charges from the first charge storage device directly to a second charge storage device and a second quantity of charges from the first charge storage device directly to a third charge storage device.

6. A focal plane array comprising:
   a plurality of quantum well photodetectors;
   a plurality of filters, each filter associated with a photodetector of the plurality of photodetectors, wherein each filter comprises:
   a first charge storage device for storing moving charges received from an associated photodetector; and
   switching means for selectively supplying a first quantity of charges from the first charge storage device directly to a second charge storage device and a second quantity of charges from the first charge storage device directly to a third charge storage device.

7. The method of claim 1, wherein:
   during the steps of accumulating the first and second quantities of charges, the first charge storage device is connected in parallel with a fourth charge storage device.

8. The method of claim 7, wherein:
   during the steps of supplying, the first charge storage device is not connected in parallel with the fourth charge storage device.

9. The method of claim 8, comprising:
   emptying the first and fourth charge storage devices of charges before the step of accumulating the first quantity of charges.

10. A focal plane array comprising:
    a plurality of quantum well photodetectors;
    a plurality of filters, each filter associated with a photodetector of said plurality of photodetectors, wherein each filter comprises:
    a charge well charge storage device;
    a cup charge storage device;
    a first bucket charge storage device;
    a second bucket charge storage device;
    switching means for connecting the charge well device and the cup device in parallel to receive charges from the photodetector;
    switching means for disconnecting the cup device from the parallel connection with the charge well device and connecting the cup device with the first bucket device; and
    switching means for disconnecting the cup device from the parallel connection with the charge well device and connecting the cup device with the second bucket device.

11. The array of claim 10, comprising:
    switching means for emptying charges from the charge well device and the cup device.

* * * * *